June 25, 1935. P. ANDERSEN 2,005,910
PUSH POLE VEHICLE
Filed April 2, 1934
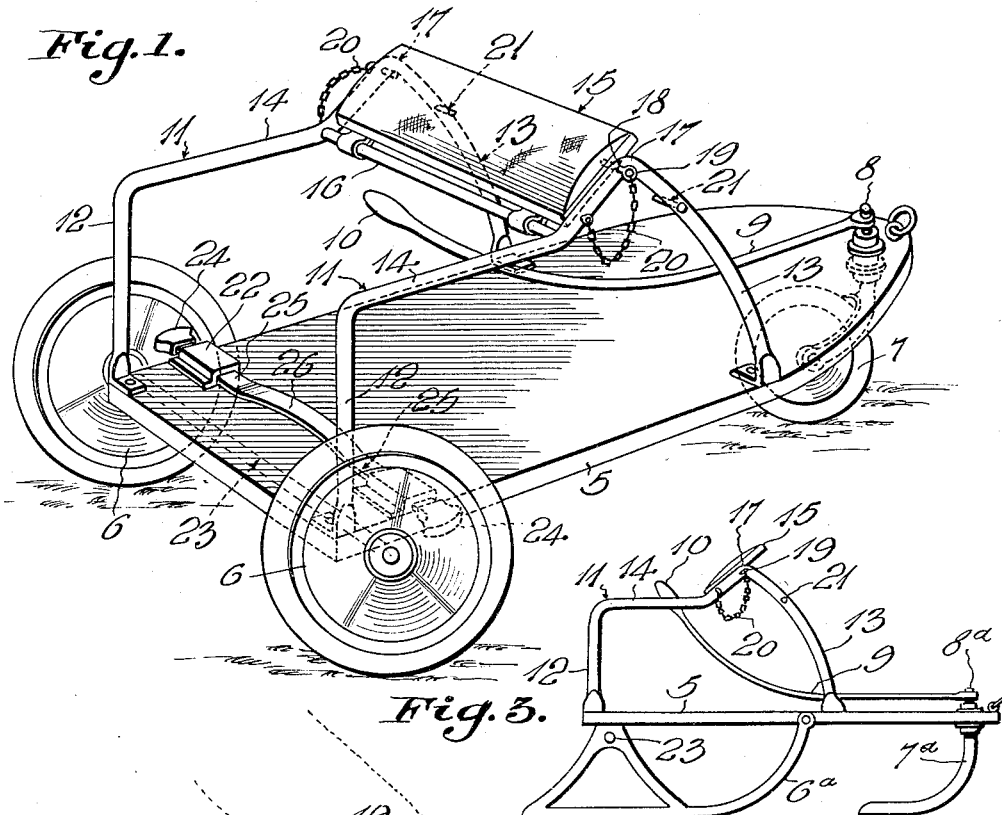
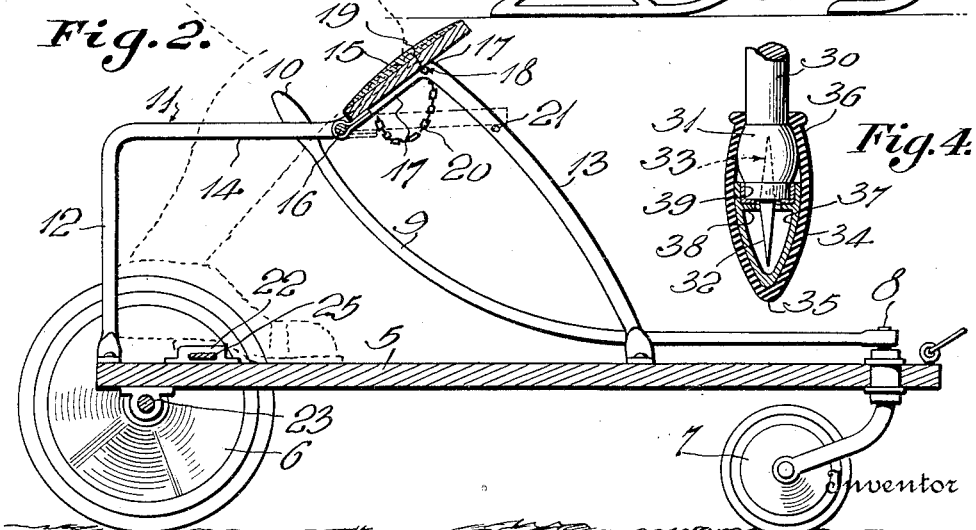
Paul Andersen Patented June 25, 1935

2,005,910

UNITED STATES PATENT OFFICE 2,005,910

PUSH-POLE VEHICLE

Paul Andersen, Brooklyn, N. Y.

Application April 2, 1934, Serial No. 718,726

3 Claims. (Cl. 280—87.5)

The invention aims to provide a simple and inexpensive recreation vehicle for children's use on sidewalks, streets, etc. The vehicle is intended primarily to be propelled by means of a push-pole, although it can of course be used also for coasting, or for drifting after pushing to attain desired speed, and then jumping on.

It is intended that the user shall stand directly upon the platform of the vehicle when he becomes sufficiently proficient, and a further object of the invention is to provide said platform with rigid leg braces against which the user may press his legs to assist him in maintaining his erect position.

A further aim is to provide the vehicle with a knee support positioned to engage the user's knees when forwardly sprung sufficiently, allowing him to partially kneel until he becomes sufficiently skilled to stand erectly on the moving vehicle, or whenever he so desires.

Another object is to provide for holding the knee support in a horizontal position when desired, to form a seat for a second passenger.

The platform-supporting means (wheels or runners) includes a caster allowing the user to steer by twisting or jerking his body in one direction or the other to turn his feet and the platform with which they remain engaged, but a further object is to provide a tiller lever for said caster, said tiller lever being so positioned that it may extend between the knees of the novice while kneeling upon the knee support, allowing him to steer by moving one knee or the other, as may be required.

Yet another aim is to provide a simple and inexpensive, yet an efficient foot brake.

With the foregoing in view, the invention resides in the novel subject matter hereinafter described and claimed, description being accomplished by reference to the accompanying drawing.

Fig. 1 is a perspective view showing the knee support in proper position to allow the user to partially kneel thereon while his feet remain upon the platform.

Fig. 2 is a central vertical longitudinal sectional view, the knee support being inclined in full lines and being shown in dotted lines in its seat-forming position.

Fig. 3 is a side elevation illustrating the vehicle equipped with runners instead of wheels.

Fig. 4 is a detail sectional view partly in elevation showing the lower end of a push-pole which is preferably used in propelling the vehicle.

In the drawing above briefly described, the numeral 5 denotes a platform which may either be supported by wheels or runners. In Figs. 1 and 2, the platform is provided with two rear wheels 6 and with a front caster wheel 7, whereas in Fig. 3, rear runners 6ᵃ and a front caster runner 7ᵃ are provided. The vertical shaft or pivotal mounting of the caster wheel 7, is shown at 8, and the corresponding part of the runner 7ᵃ is disclosed at 8ᵃ. Connected either with the member 8 or the member 8ᵃ, as the case may be, is a tiller lever 9 which extends rearwardly over the platform 5 and is provided with an upturned rear end 10.

Two arched longitudinally extending side rails 11 have their rear legs 12 and their front legs 13 suitably secured to the platform 5. The rear portions of these rails form convenient means to be gripped with the hands when pushing the vehicle to attain speed, preparatory to jumping on, and when the user stands upon the rear portion of the platform, he may outwardly press the calves of his legs against the crown portions 14 of said rails, assisting in maintaining his balance.

Extending between the crown portions 14 at the front ends thereof, is a preferably upholstered knee support 15. This knee support is pivotally mounted at its rear edge upon a transverse rod or the like 16 whose ends are secured to the crown portions 14, allowing said knee support to assume either an inclined position to engage the user's knees as shown in Fig. 2, or a horizontal position (dotted in Fig. 2) in which it constitutes a seat for a second passenger. Suitable provision is made for holding the knee support 15 in either inclined or horizontal position, and in the present disclosure, this involves providing the crown portions 14 with upwardly offset portions 17 at their front ends. These offset portions are formed with openings 18 through which pins 19, preferably carried by chains 20, may be inserted to hold the support 15 in its inclined knee-engaging position. Pins or other stops 21 may be permanently carried by the legs 13 to hold the support 15 in its horizontal seat-forming position.

The end 10 of the tiller lever 9 is behind the support 15 and projects upwardly to such an extent that it may be received approximately between the user's knees, when he is partly kneeling on said support 15, as shown by the dotted lines in Fig. 2. He preferably positions himself in this manner until he has become thoroughly accustomed to using the vehicle, and he may steer by moving one leg or the other, without moving his feet from the platform. When he becomes sufficiently proficient however, he may stand erectly and the vehicle may be steered by twisting or jerking the body in one direction or the other while leaving the feet firmly upon the platform. Thus, the direction of travel of the platform may be varied as desired, and the caster 7 or 7ᵃ will follow.

While the vehicle may be used only for coasting or for drifting after giving it an initial start and jumping on, it is preferable to provide a push-pole of any desired length. The lower end portion of such a pole is shown at 30 in Fig. 4, said pole being formed from hard wood or any other desired material. Its lower end is provided with an enlargement 31 and with a spike 32 projecting endwise from said enlargement, said spike preferably having an attaching shank 33 driven into the pole. When propelling the vehicle on ice, the push-pole is used with the spike 32 exposed and said spike keeps the lower end of the pole from slipping upon the ice. This spike may also be used when propelling the vehicle over very hard ground, but when said vehicle is being used upon sidewalks or paved streets, it is more desirable to have the lower end of the pole 30 provided with a rubber tip for anti-slipping engagement with the supporting surface. I therefore provide a rubber sheath 34 for the spike 32, said sheath having a closed lower end 35 and an open rear end 36. This rear end is stretched over the pole enlargement 33 and holds the sheath 34 in place. This sheath is preferably provided with a metal lining 37 to prevent injury thereof by the spike 32, said sheath preferably having an inwardly projecting flange portion 38 to abut the lower end of the pole 30. This pole end is preferably provided with a ring or ferrule 39 to engage the flange 38 and to prevent said pole end from splitting.

While the vehicle may be manufactured either with or without a brake, I preferably provide the foot brake herein shown. Two guides 22 are secured upon the platform 5 and are alined in a direction parallel with the rear axle 23. Two brake shoes 24 of rubber or any other suitable material, are provided to contact with the inner sides of the wheels 6. A combined carrier and actuator is provided for the shoes 24, said combined carrier and actuator preferably consisting of a single strip of spring metal. This strip is provided with two straight end portions 25 which carry the shoes 24 and are slidably engaged with the guides 22, and a bowed intermediate portion 26 connecting said end portions 25. Normally, the shoes 24 are of course spaced slightly from the inner sides of the wheels 6, but when the user presses downwardly upon the bowed portion 26, he extends the end portions 25, causing them to force the shoes 24 against said wheels to create the desired braking action.

From the foregoing, taken in connection with the accompanying drawing, it will be seen that novel and advantageous provision has been made for carrying out the objects of the invention. While the general construction herein disclosed is preferably followed, numerous variations may, of course, be made within the scope of the invention as claimed.

I claim:—

1. A vehicle comprising a platform upon the rear portion of which the user may stand, two longitudinally extending side rails secured to and projecting upwardly from said platform, a knee support extending between the upper portions of said side rails near the front ends thereof, means pivotally mounting said knee support on said side rails for swinging to an inclined position at which it may engage the user's knees when the latter are forwardly sprung, said pivotal mounting means also allowing swinging of said knee support to a horizontal position for use as a seat, means for holding said knee support in either of said positions, and supporting means for said platform.

2. A vehicle comprising a platform upon the rear portion of which the user may stand, two arched longitudinally extending side rails whose leg portions are secured to said platform, a knee support extending between the crown portions of said arched rails near the front ends thereof, means pivotally mounting said knee support on said crown portions for swinging to an inclined position at which it may engage the user's knees when forwardly sprung, said pivotal mounting means also allowing swinging of said knee support to a horizontal position for use as a seat, means for holding said knee support in either of said positions, and supporting means for said platform.

3. A vehicle comprising a platform upon the rear portion of which the user may stand, two arched longitudinally extending side rails whose leg portions are secured to said platform, a knee support extending between the crown portions of said arched rails near the front ends thereof, means pivotally mounting said knee support on said crown portions for swinging to an inclined position at which it may engage the user's knees when forwardly sprung, said pivotal mounting means also allowing swinging of said knee support to a horizontal position for use as a seat, said crown portions being provided with upwardly offset apertured portions at the ends of said knee support, pins insertable through the apertures of said offset portions to hold said knee support in said inclined position, stops projecting inwardly from said rails to hold said knee support horizontal, and supporting means for said platform.

PAUL ANDERSEN.